(12) United States Patent
Chang (10) Patent No.: US 11,431,054 B2
(45) Date of Patent: Aug. 30, 2022

(54) METHOD AND SYSTEM FOR MANAGING BATTERY PACK

(71) Applicant: Samsung SDI Co., Ltd., Yongin-si (KR)

(72) Inventor: Wongeun Chang, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 433 days.

(21) Appl. No.: 16/480,607

(22) PCT Filed: Oct. 26, 2017

(86) PCT No.: PCT/KR2017/011888
§ 371 (c)(1),
(2) Date: Jul. 24, 2019

(87) PCT Pub. No.: WO2018/139734
PCT Pub. Date: Aug. 2, 2018

(65) Prior Publication Data
US 2019/0393560 A1    Dec. 26, 2019

(30) Foreign Application Priority Data

Jan. 24, 2017  (KR) .................. 10-2017-0011137

(51) Int. Cl.
*H01M 10/42* (2006.01)
*H01M 50/20* (2021.01)
*B60L 50/64* (2019.01)

(52) U.S. Cl.
CPC ............. *H01M 50/20* (2021.01); *B60L 50/64* (2019.02); *H01M 10/425* (2013.01); *H01M 2010/4271* (2013.01); *H01M 2010/4278* (2013.01)

(58) Field of Classification Search
CPC ...... B60L 50/64; B60L 58/10; H01M 10/425; H01M 2010/4278; H01M 2220/20;
(Continued)

(56) References Cited

U.S. PATENT DOCUMENTS 8,436,575 B2   5/2013   Sim et al.
9,239,221 B2   1/2016   Heimlicher
(Continued)

FOREIGN PATENT DOCUMENTS

CN   101997322 A   3/2011
CN   103795389 A   5/2014
(Continued)

OTHER PUBLICATIONS

Machine Translation DE102010002758A1 (Year: 2011).*
(Continued)

*Primary Examiner* — Victoria H Lynch
(74) *Attorney, Agent, or Firm* — Lewis Roca Rothgerber Christie LLP (57) ABSTRACT

A battery pack management method is provided for a battery management system including at least one battery pack and a controller that are sequentially connected to each other along a first communication line, the battery pack management method including: initializing the at least one battery pack to bring the at least one battery pack into a first state in which an identification number is settable, the initializing being performed by the controller; determining an identification number of the second battery pack, based on at least one of a first signal and a second signal, the determining being performed by the second battery pack; and generating a third signal based on one of the first signal and the second signal and outputting the third signal via the first communication line, the generating and outputting being performed by the second battery pack.

17 Claims, 3 Drawing Sheets

(58) Field of Classification Search
CPC ........ H01M 50/20; Y02E 60/10; Y02T 10/70; Y02T 10/7072; Y02T 90/12; Y02T 90/16
See application file for complete search history.

(56) References Cited

U.S. PATENT DOCUMENTS

| | | | |
|---|---|---|---|
| 9,973,011 B2 | 5/2018 | Park et al. | |
| 10,243,923 B2 | 3/2019 | Jo | |
| 2011/0175574 A1 | 7/2011 | Sim et al. | |
| 2015/0084598 A1 | 3/2015 | Song | |

FOREIGN PATENT DOCUMENTS

| | | | | |
|---|---|---|---|---|
| CN | 106030964 A | 10/2016 | | |
| DE | 10-2010-002758 A1 | 9/2011 | | |
| DE | 102010002758 A1 | * 9/2011 | ............. | H05B 47/18 |
| EP | 3096431 A1 | 11/2016 | | |
| EP | 3193478 A1 | 7/2017 | | |
| JP | 2014-89858 A | 5/2014 | | |
| JP | 2014-99952 A | 5/2014 | | |
| KR | 10-2011-0087639 A | 8/2011 | | |
| KR | 10-2014-0078323 A | 6/2014 | | |
| KR | 10-2015-0011426 A | 2/2015 | | |
| KR | 10-2015-0033188 A | 4/2015 | | |
| KR | 10-2016-0041260 A | 4/2016 | | |

OTHER PUBLICATIONS

International Search Report for International Application No. PCT/KR2017/011888, dated Feb. 2, 2018, 3pp.
EPO Extended European Search Report dated Sep. 29, 2020, issued in corresponding European Patent Application No. 17893591.2 (11 pages).
CNIPA Office action dated Nov. 2, 2021, issued in CN Patent Application No. 201780084591.7, 10 pages, and English translation.
Chinese Office Action; Application No. 201780084591.1, dated Mar. 18, 2022, 8 pages; English Translation included, 12 pages.
European Office Action; Application 17893591.2, dated Mar. 1, 2022, 9 pages.

* cited by examiner

METHOD AND SYSTEM FOR MANAGING BATTERY PACK

CROSS-REFERENCE TO RELATED APPLICATION(S)

This application is a National Phase Patent Application of International Patent Application Number PCT/KR2017/011888, filed on Oct. 26, 2017, which claims priority of Korean Patent Application No. 10-2017-0011137, filed Jan. 24, 2017. The entire contents of both of which are incorporated herein by reference.

TECHNICAL FIELD

Embodiments of the present disclosure relate to a method and system for managing battery packs.

BACKGROUND ART

High-capacity battery systems are mounted on electric transportation modes such as electric automobiles, energy storage devices, etc. In general, such a high-capacity battery system includes one or more battery packs, and a controller such as a BMS manages the one or more battery packs.

In addition, the number of battery packs included in such a high-capacity battery system varies with the purposes of use and applications, and thus, it is problematic to individually set a controller according to the number of battery packs included in each system.

DESCRIPTION OF EMBODIMENTS

Technical Problem

To solve the above-described problem, the present disclosure provides a battery pack management method and system for immediately using battery packs without modifying a controller even when the number of battery packs included in a battery system varies.

In addition, the present disclosure provides a battery pack management method and system for rapidly assigning and managing the identification numbers of battery packs included in a battery system.

Solution to Problem

According to an embodiment of the present disclosure, there may be provided a battery pack management method for a battery management system including at least one battery pack and a controller that are sequentially connected to each other along a first communication line, the battery pack management method including: initializing the at least one battery pack to bring the at least one battery pack into a first state in which an identification number is settable, the initializing of the at least one battery pack being performed by the controller; determining an identification number of the second battery pack, based on at least one of a first signal and a second signal, the determining of the identification number being performed by the second battery pack; and generating a third signal based on one of the first signal and the second signal and outputting the third signal via the first communication line, the generating and outputting of the third signal being performed by the second battery pack. In this case, the first signal may be a signal generated and output via the first communication line by the controller, and the second signal may be a signal generated and output via the first communication line by a first battery pack preceding the second battery pack.

The first signal may include at least one reference pulse, and the generating of the third signal may be performed such that the third signal may include more pulses than one of the first signal and the second signal by a preset number.

The determining of the identification number may be performed such that the identification number of the second battery pack may correspond to the number of reference pulses in one of the first signal and the second signal.

When the controller precedes and is adjacent to the second battery pack along the first communication line: the determining of the identification number may be performed based on the first signal which is generated and output via the first communication line by the controller; the generating and outputting of the third signal may be performed by generating the third signal based on the first signal and outputting the third signal via the first communication line; and the third signal may be transmitted to a third battery pack which follows and is adjacent to the second battery pack along the first communication line.

When the first battery pack precedes and is adjacent to the second battery pack along the first communication line: the determining of the identification number may be performed based on the second signal which is generated and output via the first communication line by the first battery pack; and the generating and outputting of the third signal may be performed by generating the third signal based on the second signal and outputting the third signal via the first communication line.

When the controller follows and is adjacent to the second battery pack along the first communication line, the third signal may be transmitted to the controller.

According to the embodiment of the present disclosure, after the outputting of the third signal, the battery pack management method may further include performing a setting completion operation in which, based on the third signal, the controller brings the at least one battery pack into a second state in which identification number setting is completed.

According to the embodiment of the present disclosure, after the setting completion operation, the battery pack management method may further include performing a data transmitting/receiving operation in which the controller and the at least one battery pack transmit and receive a fourth signal through a second communication line that is different from the first communication line, based on the determined identification number of the battery pack.

The second communication line may connect the controller to each of the at least one battery pack.

The initializing of the at least one battery pack may include deleting an identification number of the at least one battery pack.

According to an embodiment of the present disclosure, a battery pack management system may include: at least one battery pack sequentially connected along a first communication line; and a controller sequentially connected to the at least one battery pack which is sequentially connected along the first communication line.

The controller may bring the at least one battery pack into a first state in which an identification number is settable, and a second battery pack may determine an identification number of the second battery pack, based on at least one of a first signal and a second signal, generate a third signal based on one of the first signal and the second signal, and output the third signal via the first communication line, wherein the first signal may be a signal generated and output via the first communication line by the controller, the second signal may be a signal generated and output via the first communication line by a first battery pack preceding the second battery pack, and the at least one battery pack may include the first battery pack and the second battery pack.

The first signal may include at least one reference pulse, and the second battery pack may generate the third signal in such a manner that the third signal may include more pulses than one of the first signal and the second signal by a preset number.

The second battery pack may determine the identification number of the second battery pack in such a manner that the identification number of the second battery pack may correspond to the number of reference pulses in one of the first signal and the second signal.

When the controller precedes the second battery pack along the first communication line: the second battery pack may determine the identification number of the second battery pack based on the first signal generated and output via the first communication line by the controller, generate the third signal based on the first signal, and output the third signal via the first communication line, and the third signal may be transmitted to a third battery pack which follows and is adjacent to the second battery pack along the first communication line.

When the first battery pack precedes and is adjacent to the second battery pack along the first communication line, the second battery pack may determine the identification number of the second battery pack based on the second signal generated and output via the first communication line by the first battery pack, generate the third signal based on the second signal, and output the third signal via the first communication line.

When the controller follows and is adjacent to the second battery pack along the first communication line, the third signal may be transmitted to the controller.

Based on the third signal, the controller may bring the at least one battery pack into a second state in which identification number setting is completed.

In the battery pack management system, the controller and the at least one battery pack may transmit and receive a fourth signal through a second communication line that is different from the first communication line.

The second communication line may connect the controller to each of the at least one battery pack.

Advantageous Effects of Disclosure

According to various embodiments of the present disclosure, it is possible to realize a battery pack management method and system for immediately using battery packs without modifying a controller even when the number of battery packs varies.

In addition, it is possible to realize a battery pack management method and system for rapidly assigning and managing the identification numbers of battery packs included in a battery system.

BEST MODE

According to an embodiment of the present disclosure, there may be provided a battery pack management method for a battery management system including at least one battery pack and a controller that are sequentially connected to each other along a first communication line, the battery pack management method including: initializing the at least one battery pack to bring the at least one battery pack into a first state in which an identification number is settable, the initializing of the at least one battery pack being performed by the controller; determining an identification number of the second battery pack, based on at least one of a first signal and a second signal, the determining of the identification number being performed by the second battery pack; and generating a third signal based on one of the first signal and the second signal and outputting the third signal via the first communication line, the generating and outputting of the third signal being performed by the second battery pack.

Mode of Disclosure

Advantages and features of the present disclosure, and implementation methods thereof will be clarified through the following descriptions given with reference to the accompanying drawings. However, the following embodiments of the present disclosure are non-limiting examples and may have different forms, and it should be understood that the idea and technical scope of the present disclosure cover all the modifications, equivalents, and replacements. Rather, these embodiments are provided so that this disclosure will be thorough and complete, and will fully convey the scope of the present disclosure to those skilled in the art. Moreover, detailed descriptions related to well-known functions or configurations will be omitted in order not to unnecessarily obscure subject matters of the present disclosure.

For example, specific shapes, structures, and features described in one example embodiment may be modified in another example embodiment without departing from the scope of the present disclosure. In addition, the positions or arrangement of elements described in one example embodiment may be changed in another example embodiment within the scope of the present disclosure. That is, the following description is provided for illustrative purposes only and is not intended to limit the scope of the present disclosure. The scope of the present disclosure is defined by the claims and equivalents thereof. In the drawings, similar or identical elements in many aspects are denoted with the same reference numbers. Details described in the present disclosure are examples. That is, such details may be changed in other example embodiments within the spirit and scope of the present disclosure.

It will be understood that although the terms "first," "second," etc. may be used herein to describe various elements, these elements should not be limited by these terms. These terms are only used to distinguish one element from another.

The terminology used herein is for explaining specific embodiments only and is not intended to limit the scope of the present disclosure. The terms of a singular form may include plural forms unless otherwise mentioned. It will be understood that terms such as "comprise," "include," and "have," when used herein, specify the presence of features, integers, steps, operations, elements, components, or combinations thereof, but do not preclude the presence or addition of one or more other features, integers, steps, operations, elements, components, or combinations thereof. It will be understood that although the terms "first" and "second" are used herein to describe various elements, these elements should not be limited by these terms. These terms are only used to distinguish one element or component from other elements or components.

Hereinafter, embodiments will be described in detail with reference to the accompanying drawings. In the drawings, identical or corresponding elements are denoted with the same reference numbers, and overlapping descriptions thereof will be omitted.

Figure 1:
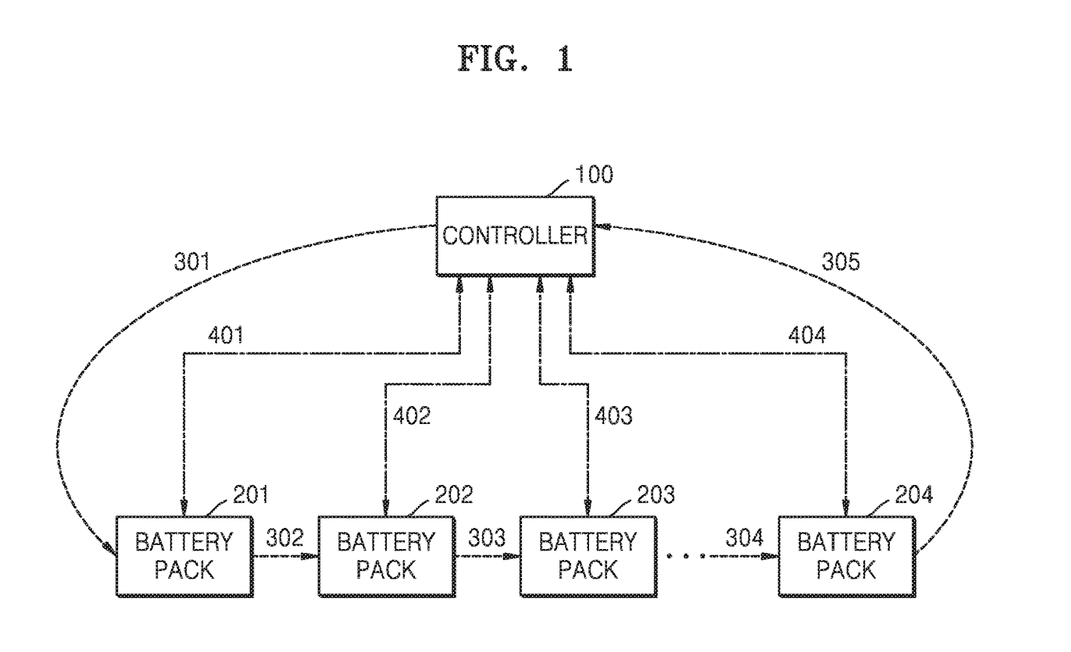
FIG. 1 is a schematic view illustrating a battery pack management system according to an embodiment of the present disclosure.

FIG. 1 is a schematic view illustrating a battery pack management system according to an embodiment of the present disclosure.

Referring to FIG. 1, the battery pack management system of the embodiment of the present disclosure may include one or more battery packs 201, 202, 203, and 204, and a controller 100.

First, each of the battery packs 201, 202, 203, and 204 of the embodiment of the present disclosure may include a rechargeable unit battery. The unit battery may include, for example, a lithium-ion battery, a lithium polymer battery, or the like, but is not limited thereto.

Each of the battery packs 201, 202, 203, and 204 of the embodiment of the present disclosure may include one or more unit batteries. In this case, the unit batteries may be connected to each other in series, parallel, or series-parallel. The number of unit batteries included in each of the battery packs 201, 202, 203, and 204 and the connection method thereof may be adjusted according to a required output voltage and electricity storage capacity.

Each of the battery packs 201, 202, 203, and 204 of the embodiment of the present disclosure may include a battery management module (not shown) to manage the unit batteries. In this case, the battery management module (not shown) may detect the state of at least one unit battery and may transmit the detected state to the controller 100. For example, the battery management module (not shown) may check the state of at least one unit battery such as the current, voltage, temperature, remaining electricity, lifespan, or state of charge (SOC) of the unit battery and may transmit results thereof to the controller 100. In this case, the battery management module (not shown) may be, for example, a cell module controller (CMC).

The battery packs 201, 202, 203, and 204 of the embodiment of the present disclosure may be sequentially connected along first communication lines 301 to 305. In this case, the controller 100 (described later) may also be sequentially connected together with the battery packs 201, 202, 203, and 204 along the first communication lines 301 to 305.

In the present disclosure, the expression "sequentially connected" may mean that the battery packs 201, 202, 203, and 204 and the controller 100 are connected to each other one after another as shown in FIG. 1.

In addition, for example, the first communication lines 301 to 305 may be communication lines for a daisy chain. However, this is an example, and the idea of the present disclosure is not limited thereto.

The controller 100 of the embodiment of the present disclosure may receive, from the battery packs 201, 202, 203, and 204, information about the state of at least one unit battery of each of the battery packs 201, 202, 203, and 204, and may perform various operations based on the information. For example, the controller 100 performs a function such as overcharge protection, overdischarge protection, overcurrent protection, overvoltage protection, overheat protection, or cell balancing based on the state of at least one unit battery included in each of the battery packs 201, 202, 203, and 204.

In addition, the controller 100 may check the state of the at least one unit battery such as the current, voltage, temperature, remaining electricity, lifespan, or state of charge (SOC) of the at least one unit battery to determine whether the at least one unit battery is abnormal.

In this case, the controller 100 may include, for example, a battery management system (BMS) or may be a BMS. However, the idea of the present disclosure is not limited thereto, and any device capable of receiving the states of the unit batteries from the battery packs 201, 202, 203, and 204 and performing proper operations according to the states may be used as the controller 100 of the present disclosure without limitations.

As described above, the controller 100 of the embodiment of the present disclosure may be sequentially connected together with the battery packs 201, 202, 203, and 204 along the first communication lines 301 to 305. In addition, the controller 100 of the embodiment of the present disclosure may be connected to the battery packs 201, 202, 203, and 204 respectively through second communication lines 401 to 404. In this case, the second communication lines 401 to 404 may be communication lines for controller area network (CAN) communication. However, this is an example, and the idea of the present disclosure is not limited thereto.

In addition, as a premise for communication with each of the battery packs 201, 202, 203, and 204 through the second communication lines 401 to 405, the controller 100 of the embodiment of the present disclosure may assign identification numbers respectively to the one or more battery packs 201, 202, 203, and 204.

Accordingly, a method of assigning identification numbers to the battery packs 201, 202, 203, and 204 in the battery pack management system of the embodiment of the present disclosure will be described below.

The controller 100 of the embodiment of the present disclosure may bring the battery packs 201, 202, 203, and 204 into a first state in which it is possible to set identification numbers. At this time, the controller 100 may transmit a signal corresponding to the change to the first state to the battery packs 201, 202, 203, and 204 through the second communication lines 401 to 404 by a broadcasting method. In addition, the battery packs 201, 202, 203, and 204, which have received the signal corresponding to the change to the first state from the controller 100, may change their states to the corresponding state, that is, the first state. For example, the battery packs 201, 202, 203, and 204 may change to the first state by deleting their present identification numbers. In other words, the battery packs 201, 202, 203, and 204 may change their identification number items to null to enter into the first state in which setting of new identification numbers is possible.

According to the embodiment of the present disclosure, in the first state in which setting of identification numbers is possible, a second battery pack may determine its identification number based on at least one of a first signal and a second signal. At this time, the "second battery pack" may refer to any one of the battery packs 201, 202, 203, and 204, which is to be described. In addition, the second battery pack may determine a number corresponding to the number of reference pulses in any one of the first signal and the second signal as its identification number.

Meanwhile, the first signal is a signal generated and output via the first communication lines 301 to 305 by the controller 100, and the second signal is a signal generated and output via the first communication lines 301 to 305 by a first battery pack preceding the second battery pack.

Next, the second battery pack according to the embodiment of the present disclosure may generate a third signal based on one of the first signal and the second signal and may output the third signal via the first communication lines 301 to 305. For example, the second battery pack may generate and output a third signal which has more pulses than one of the first signal and the second signal by a preset number.

Figure 2:
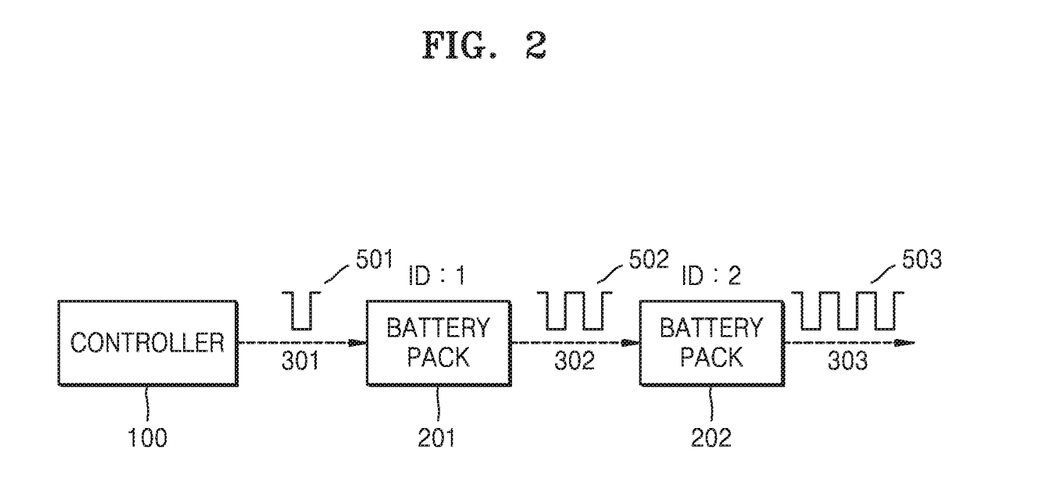
FIG. 2 is a view illustrating a process in which a second battery pack determines its identification number and outputs a third signal based on any one of a first signal and a second signal according to an embodiment of the present disclosure.

FIG. 2 is a view illustrating a process in which a second battery pack determines its identification number based on one of a first signal and a second signal and outputs a third signal according to an embodiment of the present disclosure.

In FIG. 2, it is assumed that the controller 100 outputs a first signal 501 having a single reference pulse to the first communication line 301. In addition, it is assumed that the second battery pack determines the number of reference pulses in one of a first signal and a second signal as its identification number, and generates and outputs a third signal having one more pulse than one of the first signal and the second signal.

The case in which a battery pack 201 is the second battery pack under the above-mentioned assumptions will now be described. The second battery pack 201 may determine "1" as its identification number based on the first signal 501. That is, the second battery pack 201 may determine its identification number to be the same as the number of pulses in the first signal 501. In addition, the second battery pack 201 may generate a second signal 502 having one more reference pulse than the first signal 501 and may output the second signal 502 to the first communication line 302.

In other words, when the controller 100 precedes and is adjacent to the second battery pack 201 along the first communication line 301, the second battery pack 201 may determine its identification number based on the first signal 501, generate the second signal 502 based on the first signal 501, and output the second signal 502 to the first communication line 302. In this case, the second signal 502 may be transmitted to a third battery pack 202 which follows and is adjacent to the second battery pack 201 along the first communication line 302.

Meanwhile, when the battery pack 202 is a second battery pack, the second battery pack 202 may determine "2" as its identification number based on a second signal 502, that is, may determine its identification number to be the same as the number of pulses in the second signal 502. In addition, the second battery pack 202 may generate a third signal 503 having one more reference pulse than the second signal 502 and may output the third signal 503 to the first communication line 303.

In other words, when a first battery pack 201 precedes and is adjacent to the second battery pack 202 along the first communication line 302, the second battery pack 202 may determine its identification number based on the second signal 502, generate the third signal 503 based on the second signal 502, and output the third signal 503 to the first communication line 303. In this case, the third signal 503 may be transmitted to the next adjacent battery pack (not shown).

Meanwhile, when the controller 100 follows and is adjacent to a second battery pack along a first communication line, a third signal generated by the second battery pack may be transmitted to the controller 100. As described above, since the battery packs 201, 202, 203, and 204, and the controller 100 are sequentially connected to each other, a third signal generated by the last battery pack 204 of the battery packs 201, 202, 203, and 204 may be transmitted to the controller 100.

Figure 3:
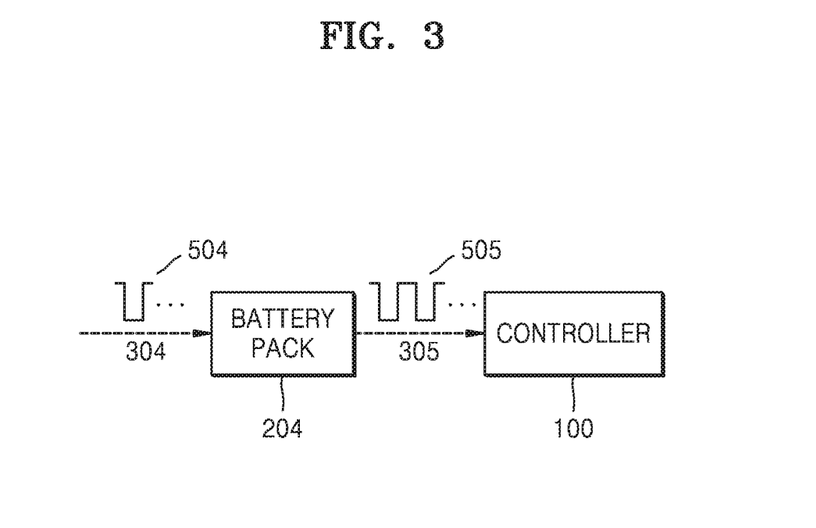
FIG. 3 is a view illustrating a situation in which a controller follows and is adjacent to a second battery pack according to an embodiment of the present disclosure.

FIG. 3 is a view illustrating a situation in which the controller 100 follows and is adjacent to a second battery pack 204 according to an embodiment of the present disclosure.

As described above, the second battery pack 204 may determine its identification number based on a second signal 504, generate a third signal 505 based on the second signal 504, and may output the third signal 505 to the first communication line 305. At this time, since the controller 100 follows and is adjacent to the second battery pack 204, the third signal 505 generated by the second battery pack 204 may be transmitted to the controller 100.

When the controller 100 receives the third signal 505 from the battery pack 204, the controller 100 may bring the battery packs 201, 202, 203, and 204 into a second state based on the third signal 505 because setting of the identification numbers of the battery packs 201, 202, 203, and 204 has been completed. At this time, the controller 100 may transmit a signal corresponding to the change to the second state to the battery packs 201, 202, 203, and 204 through the second communication lines 401 to 404 by a broadcasting method and/or a unicasting method. In addition, when the battery packs 201, 202, 203, and 204 receive the signal corresponding to the change to the second state from the controller 100, the battery packs 201, 202, 203, and 204 may change their state to the second state.

As described above, the battery pack management system of the embodiment of the present disclosure may set the identification numbers of the battery packs 201, 202, 203, and 204 in a batch, and thus, a manager of the battery pack management system may save time when setting identification numbers.

In addition, the present disclosure, the controller 100 may determine the number of battery packs included in the battery pack management system of the embodiment of the present disclosure by receiving the third signal from the battery pack 204. As described above, since reference pulses are in each signal including the third signal according to a preset rule, the controller 100 may determine the number of battery packs based on the number of reference pulses in the third signal. In this manner, the present disclosure may allow more active management in various system configurations.

When the identification numbers of the battery packs 201, 202, 203, and 204 are set according to the above-described process, the controller 100 and the battery packs 201, 202, 203, and 204 may transmit or receive fourth signals through the second communication lines 401 to 404. In this case, each of the fourth signals may be a signal corresponding to the state of at least one unit battery included in each of the battery packs 201, 202, 203, and 204 as described above, or may be a signal with which the controller 100 controls the battery packs 201, 202, 203, and 204.

In addition, since the identification numbers of the battery packs 201, 202, 203, and 204 are set, the controller 100 may communicate with a particular one and/or all of the battery packs 201, 202, 203, and 204 by transmitting and receiving signals.

Figure 4:
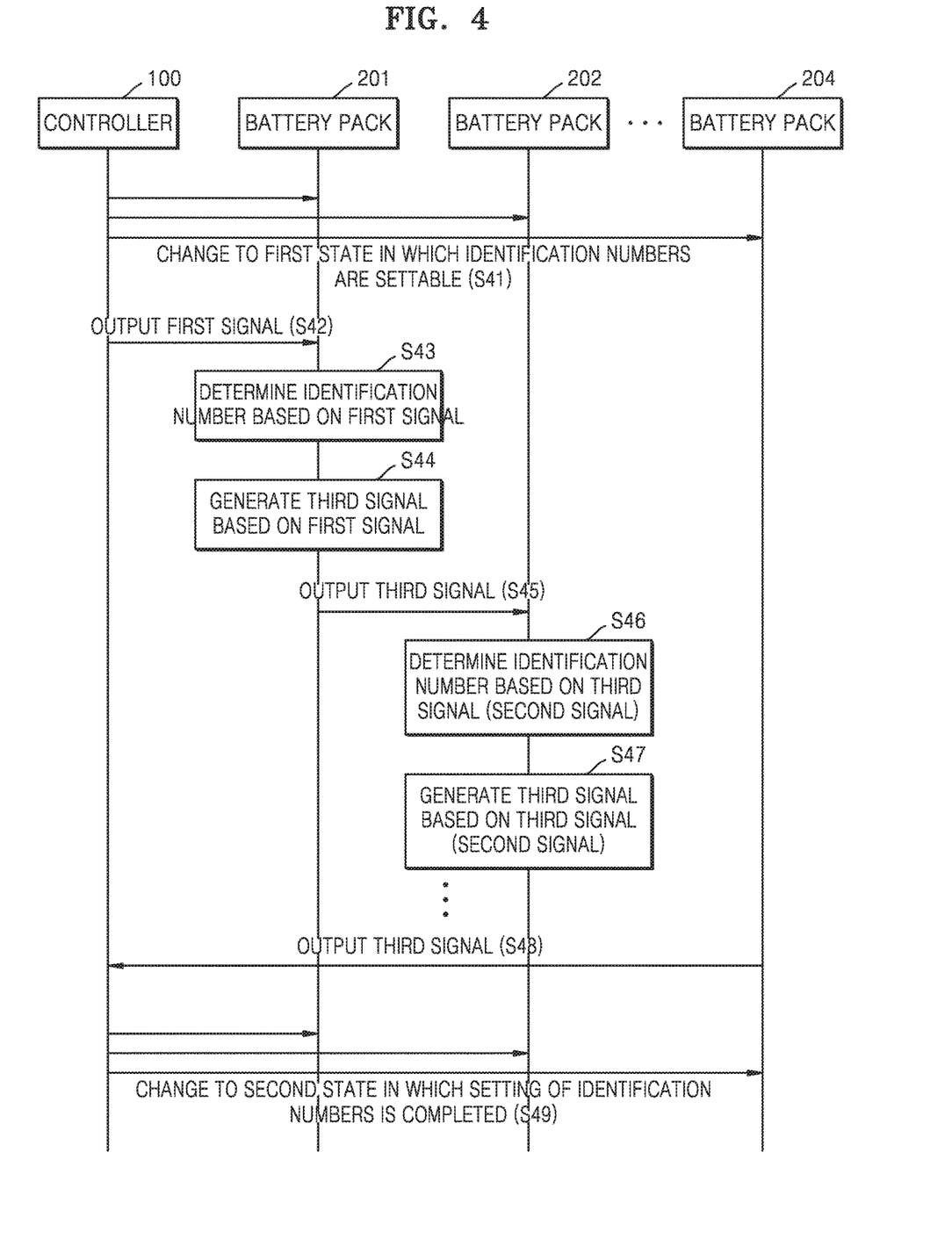
FIG. 4 is a flowchart illustrating a battery pack management method performed by the battery pack management system shown in FIG. 1.

FIG. 4 is a flowchart illustrating a battery pack management method performed by the battery pack management system shown in FIG. 1. Detailed descriptions that are the same as those given with reference to FIGS. 1 to 3 are omitted.

According to the embodiment of the present disclosure, the controller 100 brings the battery packs 201, 202, 203, and 204 into a first state in which identification numbers are settable (S41). At this time, the controller 100 may transmit a signal corresponding to the change to the first state to the battery packs 201, 202, 203, and 204 through the second communication lines 401 to 404 by a broadcasting method. In addition, when the battery packs 201, 202, 203, and 204 receive the signal corresponding to the change to the first state from the controller 100, the battery packs 201, 202, 203, and 204 may change their state to the first state. For example, the battery packs 201, 202, 203, and 204 may change to the first state by deleting their present identification numbers. In other words, the battery packs 201, 202, 203, and 204 may change their identification number items to null to enter into the first state in which setting of new identification numbers is possible.

According to the embodiment of the present disclosure, in the first state in which setting of identification numbers is possible, a second battery pack may determine its identification number based on at least one of a first signal and a second signal. At this time, the "second battery pack" may refer to any one of the battery packs 201, 202, 203, and 204, which is to be described. In addition, the second battery pack may determine a number corresponding to the number of reference pulses in one of the first signal and the second signal as its identification number.

Meanwhile, the first signal is a signal generated and output via the first communication lines 301 to 305 by the controller 100, and the second signal is a signal generated and output via the first communication lines 301 to 305 by a first battery pack preceding the second battery pack.

Next, the second battery pack according to the embodiment of the present disclosure may generate a third signal based on one of the first signal and the second signal and may output the third signal via the first communication lines 301 to 305. For example, the second battery pack may generate and output a third signal which has more pulses than one of the first signal and the second signal by a preset number.

As described above, as a starting point for setting the identification numbers of the battery packs 201, 202, 203, and 204, the controller 100 may output the first signal via the first communication lines 301 to 305 (S42).(S42)

In this case, that is, when the controller 100 precedes and is adjacent to a second battery pack 201 along the first communication line 301, the second battery pack 201 may determine its identification number based on the first signal (S43), generate a third signal based on the first signal (S44), and output the third signal to the first communication line 302 (S45). At this time, the third signal may be transmitted to a third battery pack 202 which follows and is adjacent to the second battery pack 201 along the first communication line 302.

For example, referring again to FIG. 2, it is assumed that the controller 100 outputs a first signal 501 having a single reference pulse to the first communication line 301. In addition, it is assumed that the second battery pack determines the number of reference pulses in one of a first signal and a second signal as its identification number, and generates and outputs a third signal having one more pulse than one of the first signal and the second signal.

Under the above-mentioned assumptions, the second battery pack 201 may determine "i" as its identification number based on the first signal 501. That is, the second battery pack 201 may determine its identification number to be the same as the number of pulses in the first signal 501. in addition, the second battery pack 201 may generate a second signal 502 having one more reference pulse than the first signal 501 and may output the second signal 502 to the first communication line 302.

In addition, a new second battery pack 202 that has received the second signal 502 generated by the second battery pack 201 may determine its own identification number in the same manner as the former second battery pack 201 and may output a third signal based on this.

In more detail, when the first battery pack 201 precedes and is adjacent to the second battery pack 202 along the first communication line 301, the second battery pack 202 may determine its identification number based on a second signal, that is, based on a third signal output by a former second battery pack 201 (S46), generate a third signal based on the second signal (S47), and output the third signal to the first communication line 303. In this case, the third signal may be transmitted to the next adjacent battery pack (not shown).

For example, referring again to FIG. 2, when the battery pack 202 is a second battery pack, the second battery pack 202 may determine "2" as its identification number based on a second signal 502, that is, may determine its identification number to be the same as the number of pulses in the second signal 502. In addition, the second battery pack 202 may generate a third signal 503 having one more reference pulse than the second signal 502 and may output the third signal 503 to the first communication line 303.

Meanwhile, when the controller 100 follows and is adjacent to a second battery pack along a first communication line, a third signal generated by the second battery pack may be transmitted to the controller 100. As described above, since the battery packs 201, 202, 203, and 204, and the controller 100 are sequentially connected to each other, the last battery pack 204 of the battery packs 201, 202, 203, and 204 may output a third signal to the controller 100 (S48). (S48)

Referring again to FIG. 3, as described above, the second battery pack 204 may determine its identification number based on a second signal 504, generate a third signal 505 based on the second signal 504, and may output the third signal 505 to the first communication line 305. At this time, since the controller 100 follows and is adjacent to the second battery pack 204, the third signal 505 generated by the second battery pack 204 may be transmitted to the controller 100.

When the controller 100 receives the third signal 505 from the battery pack 204, the controller 100 may bring the battery packs 201, 202, 203, and 204 into a second state based on the third signal 505 because setting of the identification numbers of the battery packs 201, 202, 203, and 204 has been completed (S49). At this time, the controller 100 may transmit a signal corresponding to the change to the second state to the battery packs 201, 202, 203, and 204 through the second communication lines 401 to 404 by a broadcasting method and/or a unicasting method. In addition, when the battery packs 201, 202, 203, and 204 receive the signal corresponding to the change to the second state from the controller 100, the battery packs 201, 202, 203, and 204 may change their state to the second state.

As described above, the battery pack management system of the embodiment of the present disclosure may set the identification numbers of the battery packs 201, 202, 203, and 204 in a batch, and thus, a manager of the battery pack management system may save time when setting identification numbers.

In addition, the controller 100 may determine the number of battery packs included in the battery pack management system of the embodiment of the present disclosure by receiving the third signal from the battery pack 204. As described above, since reference pulses are in each signal including the third signal according to a preset rule, the controller 100 may determine the number of battery packs based on the number of reference pulses in the third signal. In this manner, the present disclosure may allow more active management in various system configurations.

When the identification numbers of the battery packs 201, 202, 203, and 204 are set according to the above-described process, the controller 100 and the battery packs 201, 202, 203, and 204 may transmit or receive fourth signals through the second communication lines 401 to 404. In this case, each of the fourth signals may be a signal corresponding to the state of at least one unit battery included in each of the battery packs 201, 202, 203, and 204 as described above, or may be a signal with which the controller 100 controls the battery packs 201, 202, 203, and 204.

In addition, since the identification numbers of the battery packs 201, 202, 203, and 204 are set, the controller 100 may communicate with a particular one and/or all of the battery packs 201, 202, 203, and 204 by transmitting and receiving signals.

Preferable embodiments of the present disclosure have been mainly described. However, it will be apparent to those skilled in the art that various changes and modifications may be made without departing from the spirit and scope of the present disclosure. Therefore, the embodiments described herein should be considered in a descriptive sense only and not for purposes of limitation. The scope of the present disclosure is defined not by the above description but by the following claims, and all differences within equivalent ranges of the scope of the present disclosure should be considered as being included in the scope of the present disclosure.

The invention claimed is:

1. A battery pack management method for a battery management system including a first battery pack, a second battery pack, and a controller that are sequentially connected to each other along a first communication line, the battery pack management method comprising:
   initializing the second battery pack to bring the second battery pack into a first state in which an identification number is settable, the initializing of the second battery pack being performed by the controller;
   determining, by the second battery pack, an identification number of the second battery pack based on at least one of a first signal and a second signal; and
   generating a third signal based on one of the first signal and the second signal, and outputting the third signal via the first communication line, the generating and outputting of the third signal being performed by the second battery pack,
   wherein the first signal is a signal generated and output via the first communication line by the controller,
   wherein the second signal is a signal generated and output via the first communication line by the first battery pack preceding the second battery pack,
   wherein the first signal comprises at least one pulse,
   wherein the third signal comprises a greater number of pulses than one of the first signal and the second signal, and
   wherein at least two of the first signal, the second signal, and the third signal have a same frequency.

2. The battery pack management method of claim 1, wherein the identification number of the second battery pack corresponds to a number of reference pulses in one of the first signal and the second signal.

3. The battery pack management method of claim 1, wherein, when the controller precedes the second battery pack along the first communication line:
   the identification number of the second battery pack is based on the first signal that is generated and output via the first communication line by the controller;
   the generating and outputting of the third signal are performed by generating the third signal based on the first signal and outputting the third signal via the first communication line; and
   the third signal is transmitted to a third battery pack that follows, and that is adjacent to, the second battery pack along the first communication line.

4. The battery pack management method of claim 1, wherein, when the first battery pack is adjacent to the second battery pack along the first communication line:
   the identification number of the second battery pack is based on the second signal that is generated and output via the first communication line by the first battery pack; and
   the generating and outputting of the third signal are performed by generating the third signal based on the second signal and outputting the third signal via the first communication line.

5. The battery pack management method of claim 1, wherein, when the controller follows and is adjacent to the second battery pack along the first communication line, the third signal is transmitted to the controller.

6. The battery pack management method of claim 5, wherein, after the outputting of the third signal, the battery pack management method further comprises performing a setting completion operation in which, based on the third signal, the controller brings the second battery pack into a second state in which identification number setting is completed.

7. The battery pack management method of claim 6, wherein, after the setting completion operation, the battery pack management method further comprises performing a data transmitting/receiving operation in which the controller and the second battery pack transmit and receive a fourth signal through a second communication line that is different from the first communication line, based on the determined identification number of the second battery pack.

8. The battery pack management method of claim 7, wherein the second communication line connects the controller to the first battery pack and the second battery pack.

9. The battery pack management method of claim 1, wherein the initializing of the second battery pack comprises deleting an identification number of the second battery pack.

10. A battery pack management system comprising:
   a first communication line;
   a first battery pack;
   a second battery pack; and
   a controller sequentially connected to the first battery pack and the second battery pack, which are sequentially connected along the first communication line, wherein the controller is configured to bring the second battery pack into a first state in which an identification number is settable, wherein the second battery pack is configured to determine an identification number of the second battery pack based on at least one of a first signal and a second signal, is configured to generate a third signal based on one of the first signal and the second signal, and is configured to output the third signal via the first communication line, wherein the first signal is generated and output via the first communication line by the controller, wherein the second signal is generated and output via the first communication line by the first battery pack preceding the second battery pack, wherein the first signal comprises at least one pulse, wherein the third signal comprises a greater number of pulses than one of the first signal and the second signal, and wherein at least two of the first signal, the second signal, and the third signal have a same frequency.

11. The battery pack management system of claim 10, wherein the identification number of the second battery pack corresponds to a number of pulses in one of the first signal and the second signal.

12. The battery pack management system of claim 10, wherein, when the controller precedes the second battery pack along the first communication line:

the identification number of the second battery pack is based on the first signal generated and is output via the first communication line by the controller;

the second battery pack is configured to generate the third signal based on the first signal, and is configured to output the third signal via the first communication line; and the third signal is transmitted to a third battery pack that follows, and that is adjacent to, the second battery pack along the first communication line.

13. The battery pack management system of claim 10, wherein, when the first battery pack precedes and is adjacent to the second battery pack along the first communication line, the identification number of the second battery pack is based on the second signal generated and output via the first communication line by the first battery pack, and the second battery pack is configured to generate the third signal based on the second signal, and is configured to output the third signal via the first communication line.

14. The battery pack management system of claim 10, wherein, when the controller follows and is adjacent to the second battery pack along the first communication line, the third signal is transmitted to the controller.

15. The battery pack management system of claim 14, wherein, based on the third signal, the controller is configured to bring the second battery pack into a second state in which identification number setting is completed.

16. The battery pack management system of claim 15, wherein the controller and the second battery pack are configured to transmit and receive a fourth signal through a second communication line that is different from the first communication line, based on the determined identification number of the second battery pack.

17. The battery pack management system of claim 16, wherein the second communication line connects the controller to the first battery pack and the second battery pack.

* * * * *